United States Patent
Hashimoto et al.

(10) Patent No.: US 12,103,088 B2
(45) Date of Patent: Oct. 1, 2024

(54) HOLDER, CUTTING TOOL, METHOD FOR MANUFACTURING MACHINED PRODUCT, AND METHOD FOR COLLECTING DATA

(71) Applicant: KYOCERA CORPORATION, Kyoto (JP)

(72) Inventors: Shigetaka Hashimoto, Konan (JP); Chiharu Yamazaki, Tokyo (JP); Hirokazu Takahashi, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 583 days.

(21) Appl. No.: 17/432,480

(22) PCT Filed: Feb. 20, 2020

(86) PCT No.: PCT/JP2020/006694
§ 371 (c)(1),
(2) Date: Aug. 19, 2021

(87) PCT Pub. No.: WO2020/171157
PCT Pub. Date: Aug. 27, 2020

(65) Prior Publication Data
US 2022/0143710 A1 May 12, 2022

(30) Foreign Application Priority Data
Feb. 20, 2019 (JP) ................................ 2019-028711

(51) Int. Cl.
B23B 27/14 (2006.01)
B23Q 17/09 (2006.01)
B23B 29/12 (2006.01)

(52) U.S. Cl.
CPC .......... *B23B 27/14* (2013.01); *B23Q 17/0971* (2013.01); *B23Q 17/0985* (2013.01); *B23B 29/12* (2013.01); *B23B 2260/1285* (2013.01)

(58) Field of Classification Search
CPC ............ B23B 27/14; B23B 2260/1285; B23B 2260/128; B23B 29/12; B23B 29/125; B23Q 17/0971; B23Q 17/0985
See application file for complete search history.

(56) References Cited

U.S. PATENT DOCUMENTS 4,555,955 A * 12/1985 Morgan ................ G01L 5/1627
73/862.06
4,587,697 A * 5/1986 Link ...................... B23Q 7/047
82/124
(Continued)

FOREIGN PATENT DOCUMENTS

DE 102007036002 A1 2/2009
EP 3292929 A1 * 3/2018 ............. B23B 25/06
(Continued)

*Primary Examiner* — Sara Addisu
(74) *Attorney, Agent, or Firm* — HAUPTMAN HAM, LLP

(57) ABSTRACT

A holder may include a base, an antenna and a sensor. The base has a bar shape extended along a central axis from a first end toward a second end. The base may include a metal member and a first resin. The metal member may include a pocket that is attachable of an insert including a cutting edge. The first resin may be located closer to the second end than the metal member. The antenna may be covered with the first resin. The sensor may be located closer to the pocket than the antenna and may be wired connected to the antenna, and may be measurable a state of the base. This configuration may contribute to solving the problem that handling of wiring becomes complicated.

12 Claims, 15 Drawing Sheets

(56) References Cited

U.S. PATENT DOCUMENTS

| | | | | |
|---|---|---|---|---|
| 4,646,595 A * | 3/1987 | Slee | B23B 29/125 | 82/904 |
| 5,810,528 A * | 9/1998 | O'Connor | B23B 29/022 | 409/141 |
| 5,842,392 A * | 12/1998 | Pfeifer | B23Q 16/06 | 82/120 |
| 5,947,658 A * | 9/1999 | Eysel | B23Q 15/013 | 408/180 |
| 6,122,999 A * | 9/2000 | Durazo | C07K 14/47 | 82/134 |
| 6,257,109 B1 * | 7/2001 | Shinohara | B23Q 39/02 | 82/120 |
| 6,352,496 B1 * | 3/2002 | Oldani | B23Q 1/5406 | 82/122 |
| 6,424,821 B1 | 7/2002 | Komai et al. | | |
| 6,609,441 B1 * | 8/2003 | Sugimoto | B23Q 16/065 | 82/120 |
| 7,289,873 B2 * | 10/2007 | Redecker | B23Q 1/0009 | 340/310.17 |
| 7,357,197 B2 * | 4/2008 | Schultz | E21B 47/18 | 175/48 |
| 8,113,066 B2 * | 2/2012 | Eckstein | B23Q 17/0966 | 73/862.045 |
| 9,242,329 B2 * | 1/2016 | Vedel | B23Q 17/22 | |
| 9,724,795 B2 * | 8/2017 | Rola | G05B 19/12 | |
| 11,311,953 B2 * | 4/2022 | Ohno | B23F 23/1218 | |
| 11,346,207 B1 * | 5/2022 | Alshaikh | E21B 10/60 | |
| 2002/0146296 A1 * | 10/2002 | Schmitz | B23Q 17/0976 | 409/141 |
| 2002/0170397 A1 * | 11/2002 | Sauter | B23Q 1/0009 | 74/813 L |
| 2005/0188798 A1 * | 9/2005 | Bischof | F16C 32/0489 | 82/1.11 |
| 2006/0159533 A1 * | 7/2006 | Zeiler | B25D 17/00 | 408/226 |
| 2006/0219066 A1 * | 10/2006 | Nicholl | F16C 32/0614 | 82/1.5 |
| 2007/0221020 A1 * | 9/2007 | D'Antonio | B23Q 17/2233 | 82/118 |
| 2009/0107309 A1 * | 4/2009 | Greenwald | B23B 25/06 | 82/112 |
| 2009/0133239 A1 * | 5/2009 | Tanaka | B23B 25/06 | 703/22 |
| 2009/0175694 A1 * | 7/2009 | Craig | B23B 51/00 | 700/173 |
| 2009/0234490 A1 * | 9/2009 | Suprock | B23B 31/02 | 408/116 |
| 2013/0088364 A1 * | 4/2013 | Bittar | G01V 3/20 | 175/425 |
| 2014/0030037 A1 * | 1/2014 | Jensen | B23B 27/10 | 408/60 |
| 2015/0374930 A1 * | 12/2015 | Hyde | A61M 5/3291 | 604/239 |
| 2016/0045994 A1 * | 2/2016 | Jayr | B23Q 17/0966 | 407/66 |
| 2016/0303698 A1 * | 10/2016 | Takahashi | B23Q 17/0966 | |
| 2016/0348500 A1 * | 12/2016 | Piscsalko | E21B 47/00 | |
| 2017/0209974 A1 * | 7/2017 | Angel | B23Q 17/0971 | |
| 2018/0067003 A1 * | 3/2018 | Michiwaki | G01L 5/0004 | |
| 2018/0147684 A1 * | 5/2018 | Ekback | B23Q 17/2225 | |
| 2018/0178293 A1 * | 6/2018 | Yamamoto | B23G 5/00 | |
| 2018/0180522 A1 * | 6/2018 | Kalhori | B23B 27/1614 | |
| 2018/0221965 A1 * | 8/2018 | Vezzoli | B23Q 3/15506 | |
| 2018/0311779 A1 * | 11/2018 | Ziegltrum | B23Q 17/0985 | |
| 2018/0326511 A1 * | 11/2018 | Vezzoli | B23B 29/34 | |
| 2019/0001456 A1 * | 1/2019 | Kalhori | B23B 31/005 | |
| 2019/0126357 A1 * | 5/2019 | Allyn | B23B 29/32 | |
| 2019/0201984 A1 * | 7/2019 | Standal | B23Q 17/12 | |
| 2019/0299352 A1 * | 10/2019 | Michiwaki | B23B 51/00 | |
| 2022/0250116 A1 * | 8/2022 | Marx | G01H 13/00 | |
| 2022/0274183 A1 * | 9/2022 | Hashimoto | B23Q 17/0985 | |
| 2022/0281046 A1 * | 9/2022 | Hashimoto | B23Q 17/09 | |
| 2022/0288739 A1 * | 9/2022 | Yamazaki | H04W 4/38 | |
| 2024/0066653 A1 * | 2/2024 | Zhang | B23Q 17/0985 | |
| 2024/0198432 A1 * | 6/2024 | Harada | B23B 27/14 | |

FOREIGN PATENT DOCUMENTS

| | | | |
|---|---|---|---|
| JP | S544492 U | | 1/1979 |
| JP | H241851 A | | 2/1990 |
| JP | H10225847 A | | 8/1998 |
| JP | 201220359 A | | 2/2012 |
| JP | 2020062746 A | * | 4/2020 |
| WO | 2017094531 A1 | | 6/2017 |
| WO | 2018029308 A1 | | 2/2018 |
| WO | WO-2018047834 A1 | * | 3/2018 ............ B23B 27/00 |

* cited by examiner

HOLDER, CUTTING TOOL, METHOD FOR MANUFACTURING MACHINED PRODUCT, AND METHOD FOR COLLECTING DATA

CROSS-REFERENCE TO RELATED APPLICATION

This application is a national stage entry according to 35 U.S.C. 371 of PCT Application No. PCT/JP2020/006694 filed on Feb. 20, 2020, which claims priority to Japanese Patent Application No. 2019-028711, filed Feb. 20, 2019. The contents of this applications are incorporated herein by reference in their entirety.

TECHNICAL FIELD

The present disclosure generally may relate to a holder measurable a state of a cutting process in the cutting process of a workpiece. More specifically, the present disclosure may relate to a holder capable of communicating with the outside about a measured state of the cutting process.

BACKGROUND

For example, a cutting tool is discussed in Japanese Unexamined Patent Publication No. 2012-20359 (Patent Document 1) as a cutting tool for use in the cutting process of a workpiece such as metal. The cutting tool discussed in Patent Document 1 may include a base, a cutting edge, a sensor part, a cable and a communication part. The state of the cutting process may be measurable by the communication part connected to the cable in an attachable/detachable manner.

The communication part may be connected through the cable to the base in the cutting tool discussed in Patent Document 1. This may cause an increase in the number of wires besides power supply wiring for supplying power to the communication part, thus complicating handling of the wires.

SUMMARY

A holder in a non-limiting aspect of the present disclosure may include a base, an antenna and a sensor. The base may have a bar shape extended along a central axis from a first end toward a second end. The base may include a metal member and a first resin. The metal member may include a pocket that is attachable of an insert including a cutting edge. The first resin may be located closer to the second end than the metal member. The antenna may be covered with the first resin. The sensor may be located closer to the pocket than the antenna, and may be wired connected to the antenna. The sensor may be measurable a state of the base.

EMBODIMENTS

Figure 1:
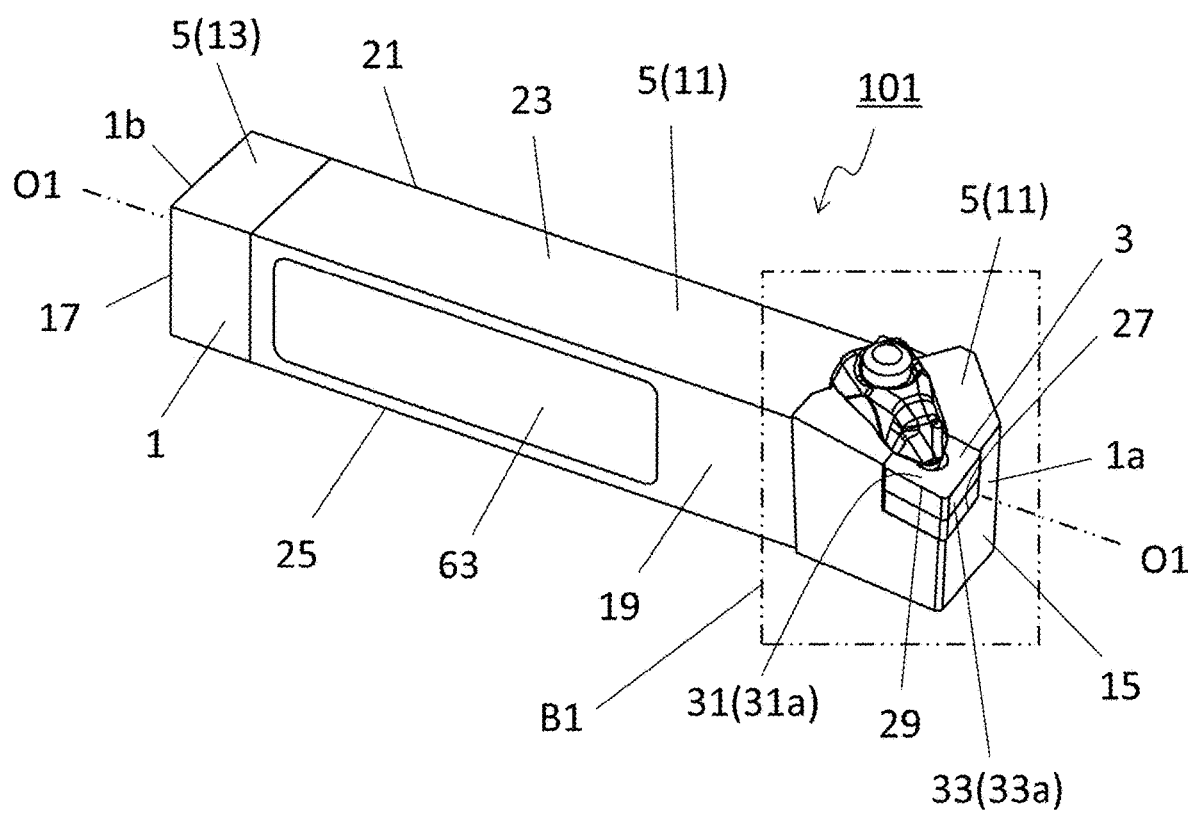
FIG. 1 is a perspective view illustrating a cutting tool of a non-limiting embodiment.

Cutting tools 101 including a holder 1 in non-limiting embodiments of the present disclosure may be individually described in detail below with reference to the drawings. For the sake of description, each of the drawings referred to in the following may illustrate, in a simplified form, only main members necessary for describing the embodiments. Hence, the cutting tools 101 may include any structural member not illustrated in the drawings referred to. Dimensions of the members in each of the drawings may not be ones which faithfully represent dimensions of actual structural members and dimension ratios of these members.

<Cutting Tools>

Examples of the cutting tools 101 may include turning tools, rotating tools and drills. Examples of the turning tools may include outer diameter processing tools, inner diameter processing tools, grooving tools and cutting-off tools. Examples of the rotating tools may include milling tools and end mills.

The cutting tool 101 in a non-limiting embodiment may include a holder 1 and a cutting insert 3 (hereinafter also simply referred to as the insert 3). The cutting tool 101 in the non-limiting embodiment illustrated in FIG. 1 may be a turning tool. There is no problem even if the cutting tool 101 is the rotating tool or drill as described above.

The holder 1 may include a base 5, an antenna 7 and a sensor 9 in the non-limiting embodiment. The base 5 may have a bar shape extended from a first end 1a toward a second end 1b in the non-limiting embodiment. In general, the first end 1a may be a front end and the second end 1b may be a rear end. The base 5 may have a quadrangular prism shape as in the non-limiting embodiment illustrated in FIG. 1. Assuming that an imaginary straight line extended from the first end 1a toward the second end 1b may be a central axis O1, it can also be said that the base 5 includes the central axis O1 and is extended along the central axis O1.

The base 5 may be composed by a plurality of members. For example, the base 5 may include a metal member 11 located on a side of the first end 1, and a first resin 13 located closer to the second end than the metal member 11 as illustrated in FIG. 1. The metal member 11 may include a first end 1*a* as in the non-limiting embodiment illustrated in FIG. 1. The first resin 13 may include the second end 1*b* as in the non-limiting embodiment illustrated in FIG. 1.

The first resin 13 may be in contact with the metal member 11. Alternatively, the first resin 13 may be located away from the metal member 11 by interposing a different member between the first resin 13 and the metal member 11. If the first resin 13 is in contact with the metal member 11, the first resin 13 may be joined to or may be merely in contact with the metal member 11.

The base 5 may include a first end surface 15, a second end surface 17, a first side surface 19, a second side surface 21, a third side surface 23 and a fourth side surface 25. The first end surface 15 may be located on the first end 1*a*. The second end surface 17 may be located on the second end 1*b*.

The first side surface 19, the second side surface 21, the third side surface 23 and the fourth side surface 25 may be individually extended from the first end 1*a* toward the second end 1*b*. The second side surface 21 may be located on a side opposite to the first side surface 19. The third side surface 23 and the fourth side surface 25 may be individually located between the first side surface 19 and the second side surface 21. The fourth side surface 25 may be located on a side opposite to the third side surface 23. The third side surface 23 and the fourth side surface 25 may be individually orthogonal to the first side surface 19 and the second side surface 21.

The metal member 11 may include a pocket 27 in the non-limiting embodiment. The insert 3 including a cutting edge 29 may be attachable to the pocket 27. The pocket 27 may be located on a side of the first end 1*a*. The pocket 27 may open into the first end surface 15, the first side surface 19 and the third side surface 23 in the non-limiting embodiment illustrated in FIG. 1.

The insert 3 may include the cutting edge 29 and may have the function of cutting out a workpiece in a cutting process. The insert 3 may have a quadrangular plate shape, and may include a first surface 31 and a second surface 33 as in the non-limiting embodiment illustrated in FIG. 1. The first surface 31 may include a first region 31*a* along which chips flow. The first region 31*a* may generally be called a rake surface.

The second surface 33 may be adjacent to the first surface 31. The second surface 33 may include a second region 33*a* opposed to a machined surface of the workpiece. The second region 33*a* may generally be called a flank surface. The cutting edge 29 may be located on at least a part of an intersection of the first surface 31 and the second surface 33.

Figure 3:
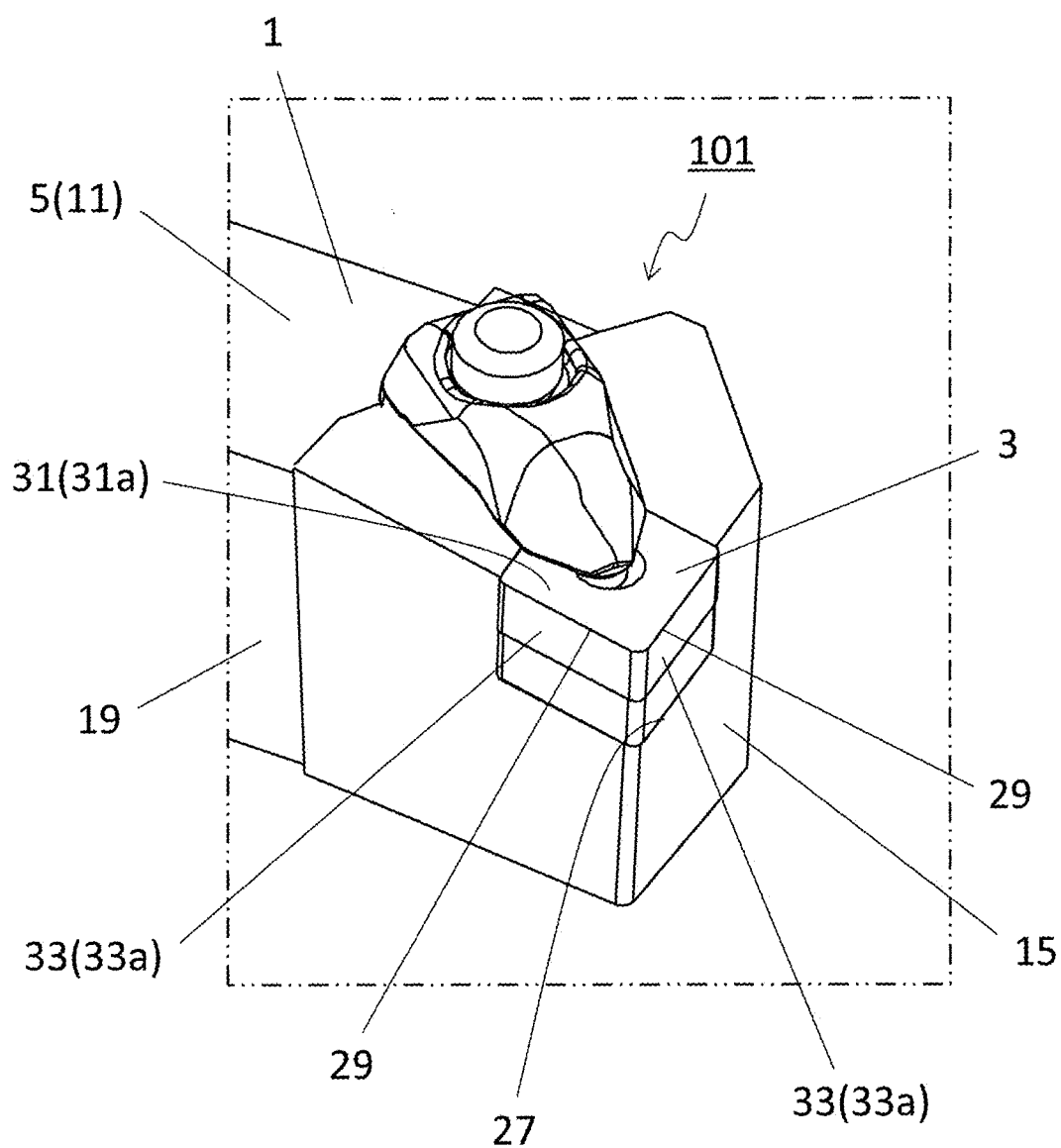
FIG. 3 is an enlarged view of a region B1 illustrated in FIG. 1.
Figure 4:
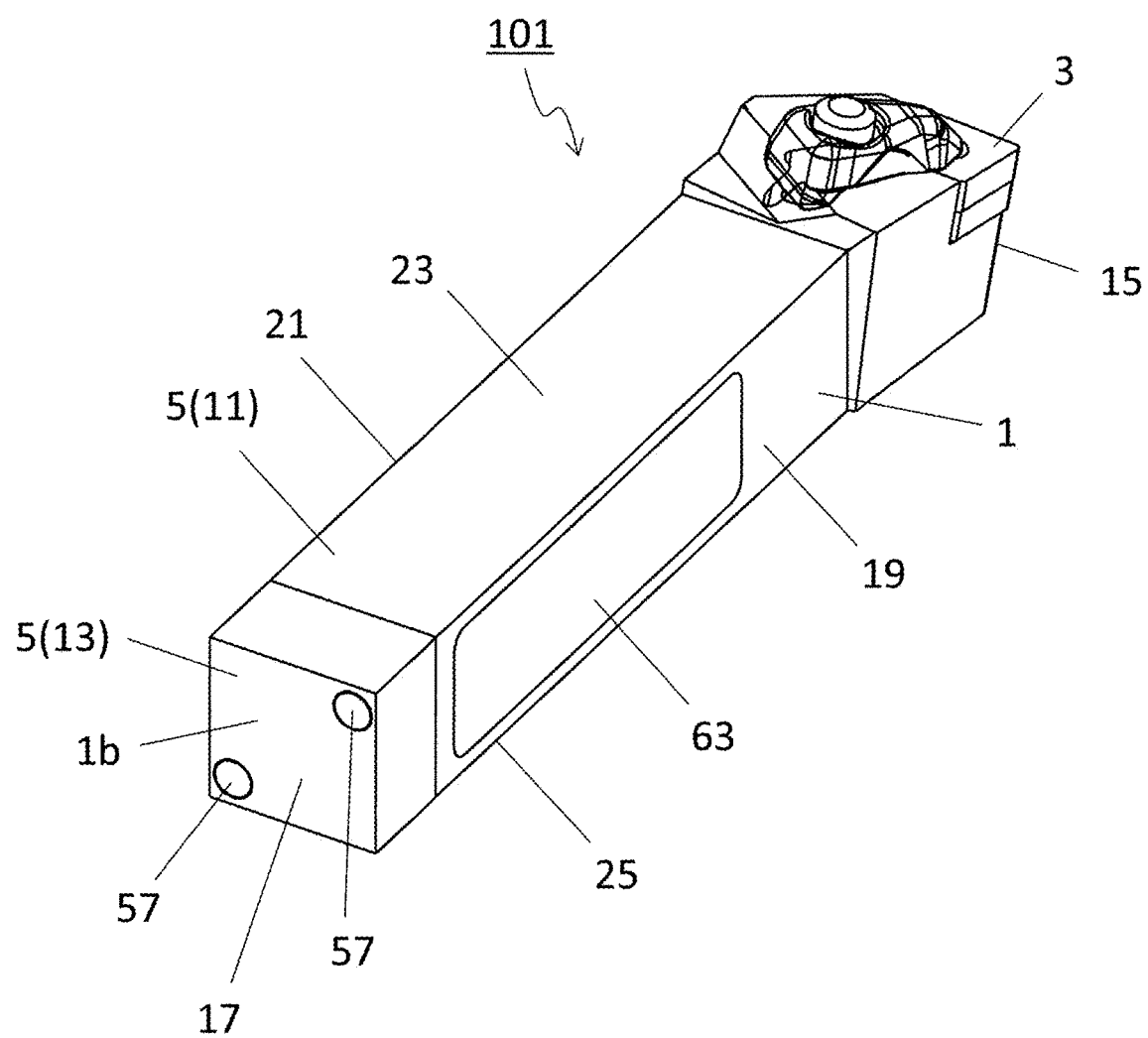
FIG. 4 is a perspective view of the cutting tool illustrated in FIG. 1 as viewed from a different direction.

The first surface 31 of the insert 3 may be located approximately parallel to the third side surface 23 of the base 5 as in a non-limiting embodiment illustrated in FIG. 3. In other words, the first surface 31 may be located so as to be approximately orthogonal to the first side surface 19 and the second side surface 21. In this case, a principal force may tend to be applied to the cutting tool 101 in a direction approximately orthogonal to the third side surface 23.

The shape of the insert 3 is not limited to the above embodiment. The insert 3 in the non-limiting embodiment may have the quadrangular plate shape in which the first surface 31 has a quadrangular shape. Alternatively, the first surface 31 may have a triangular, pentagonal or hexagonal shape. That is, the insert 3 may have, for example, a triangular plate shape, a pentagonal plate shape or a hexagonal plate shape.

Dimensions of the insert 3 are not particularly limited. For example, a length of one side of the first surface 31 may be set to approximately 3-20 mm. A height of the insert 3 indicated by a direction orthogonal to the first surface 31 may be set to approximately 5-20 mm.

For example, cemented carbide and cermet may be usable as a material of the insert 3. Examples of composition of the cemented carbide may include WC—Co, WC—TiC—Co and WC—TiC—TaC—Co, in which WC, TiC and TaC may be hard particles and Co may be a binding phase.

The cermet may be a sintered composite material obtainable by compositing metal into a ceramic component. Examples of the cermet may include titanium compounds composed mainly of titanium carbide (TiC) and/or titanium nitride (TiN). Of course, it should be clear that the material of the insert 3 is not limited to the above composition.

A surface of the insert 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

Dimensions of the base 5 are not particularly limited. For example, a length from the first end 1*a* to the second end 1*b* may be set to approximately 50-200 mm. A distance between the first side surface 19 and the second side surface 21 may be set to approximately 5-30 mm. A distance between the third side surface 23 and the fourth side surface 25 may be set to approximately 5-30 mm.

The antenna 7 may be covered with the first resin 13, and may be connected to the sensor 9. Information about the base 5 measured by the sensor 9 may be transmitted to the antenna 7, and wireless communication with the outside can be established in the antenna 7.

The antenna 7 may be located inside the base 5 instead of being connected to the base 5 by a cable in the non-limiting embodiment. This may eliminate the need for the cable that connects the sensor 9 and the antenna 7, thus facilitating handling of the holder 1.

Figure 2:
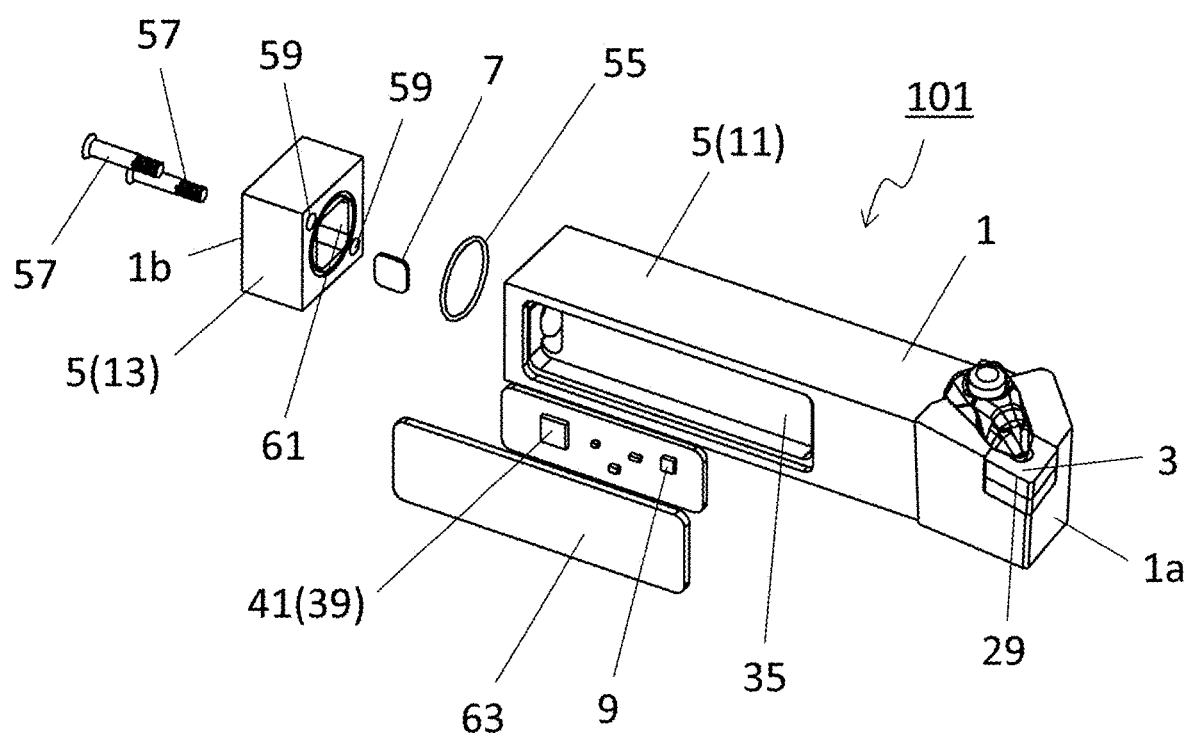
FIG. 2 is an exploded perspective view of the cutting tool illustrated in FIG. 1.

The antenna 7 may be located inside the base 5 in a state of being covered with the first resin 13 as in the non-limiting embodiment illustrated in FIG. 2. The first resin 13 may be located near the second end 1*b*. The second end 1*b* may be located on a side opposite to the side of the first end 1*a* where the pocket 27 is located. Specifically, the antenna 7 located near the second end 1*b* may be located far away from the pocket 27 located on the side of the first end 1*a*.

Chips may occur on the cutting edge 29 in a cutting process of a workpiece for manufacturing a machined product. A coolant may be sprayed toward the cutting edge 29. However, if the antenna 7 is located far away from the pocket 27, the antenna 7 may be less susceptible to influences of scattering of the chips and spray of the coolant. The antenna 7 may therefore have enhanced durability.

Additionally, in cases where the antenna 7 is not only located far away from the pocket 27 but is also covered with the first resin 13, the first resin 13 may be servable as a cover for the antenna 7. Consequently, the antenna 7 may be much less susceptible to the influences of the scattering of the chips and the spray of the coolant, and the antenna 7 may have further enhanced durability.

Figure 8:
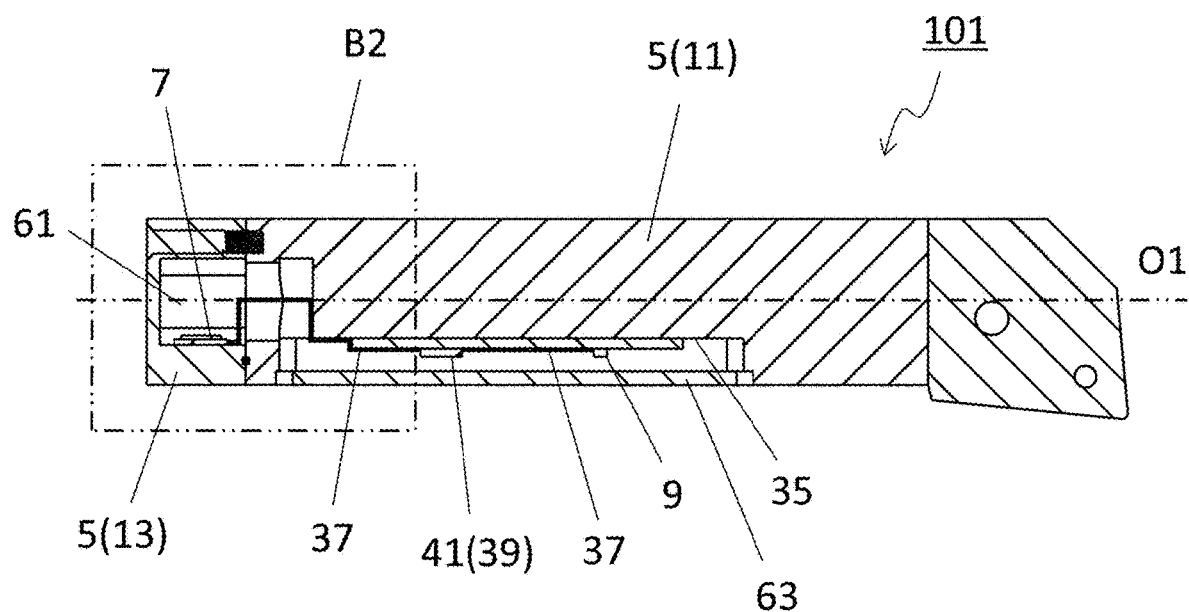
FIG. 8 is a sectional view of the cutting tool illustrated in FIG. 7, taken along line VIII-VIII.
Figure 9:
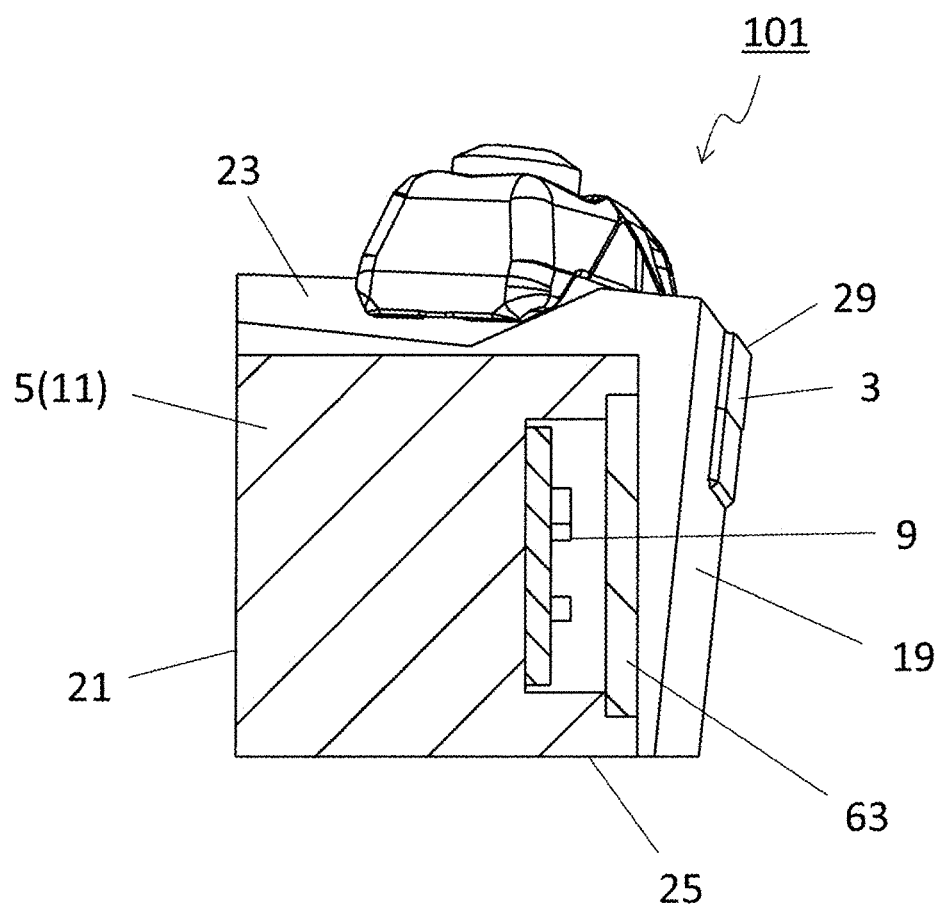
FIG. 9 is a sectional view of the cutting tool illustrated in FIG. 7, taken along line IX-IX.
Figure 10:
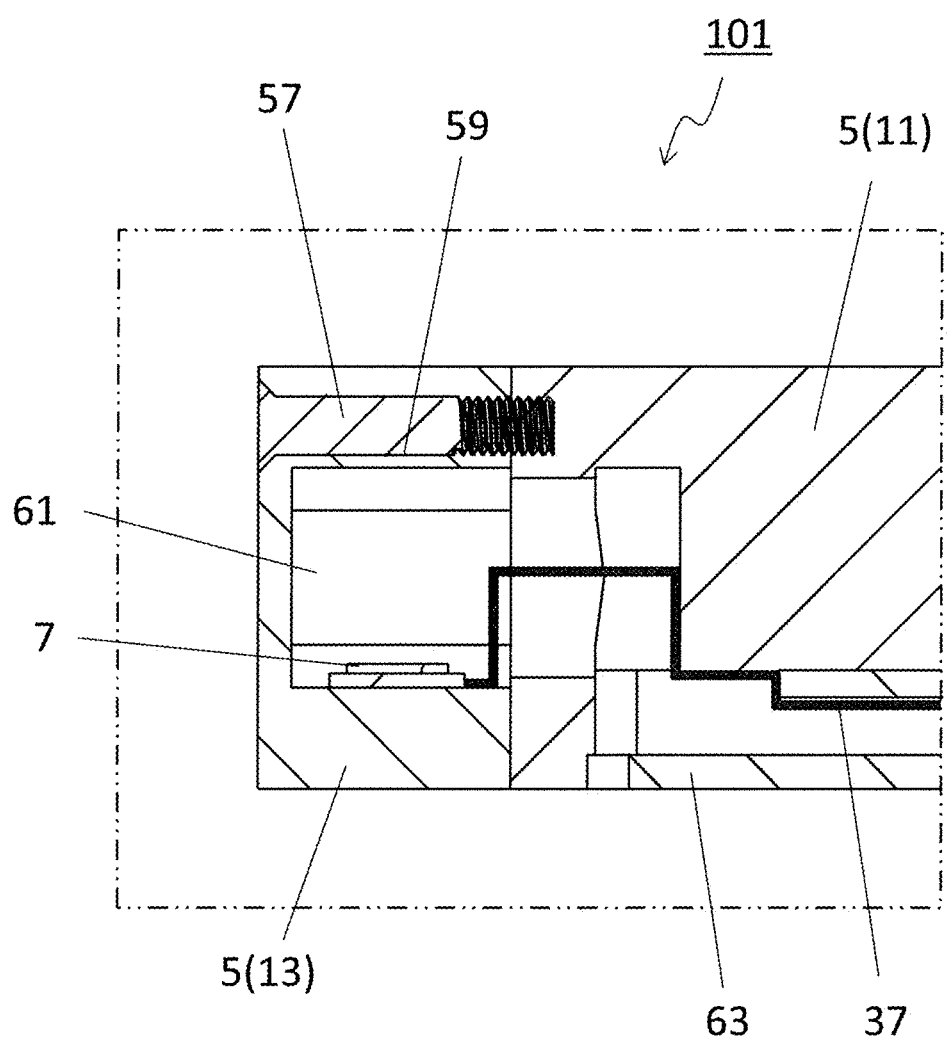
FIG. 10 is an enlarged view of a region B2 illustrated in FIG. 8.

Cutting load may be exerted on the holder 1 in a direction from a side of the first end 1*a* toward a side of the second end 1*b* during the cutting process. For example, thrust force may be applied from the side of the first end 1*a* toward the side of the second end 1*b* in a cutting tool 101 illustrated in FIG. 8. In this case, it may be possible to support the holder 1 by the first resin 13 instead of the antenna 7. The holder 1 may therefore be less susceptible to positional deviation.

Figure 6:
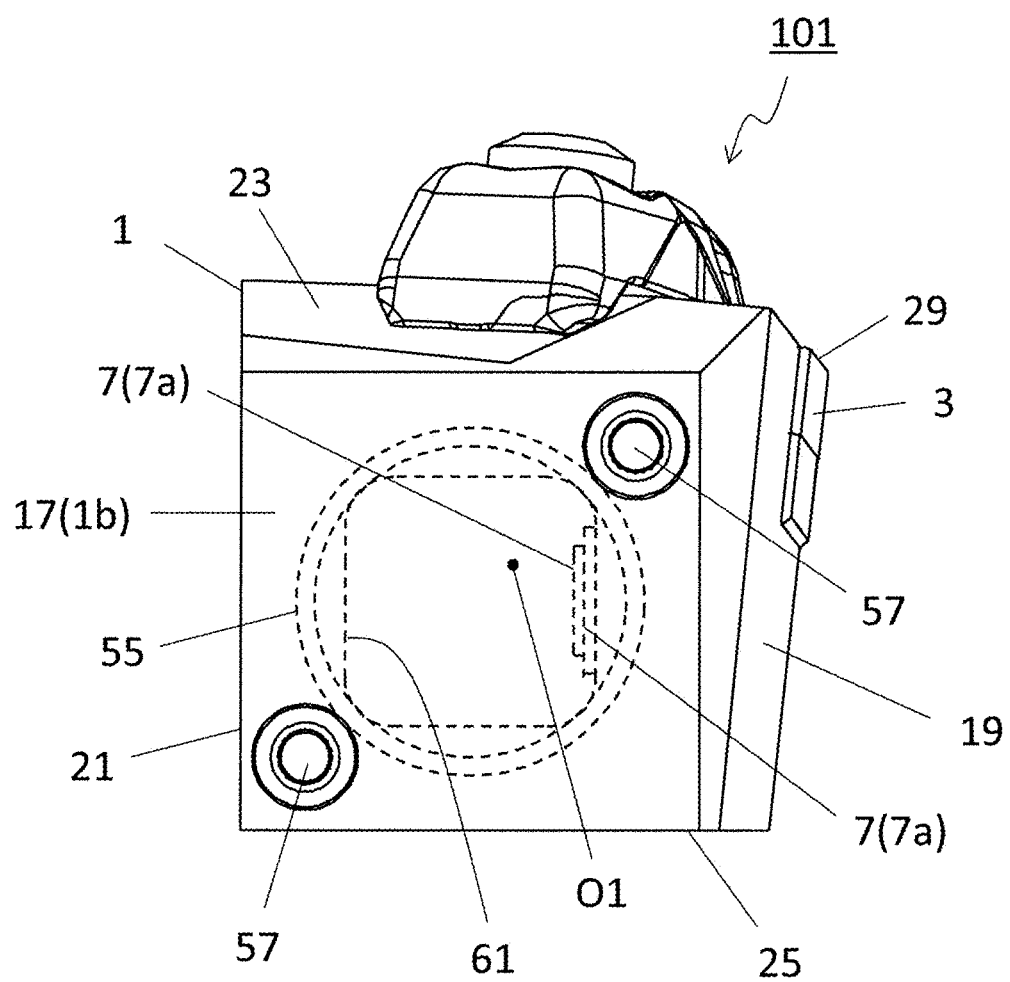
FIG. 6 is a plan view of the cutting tool illustrated in FIG. 1 as viewed toward a second end.
Figure 7:
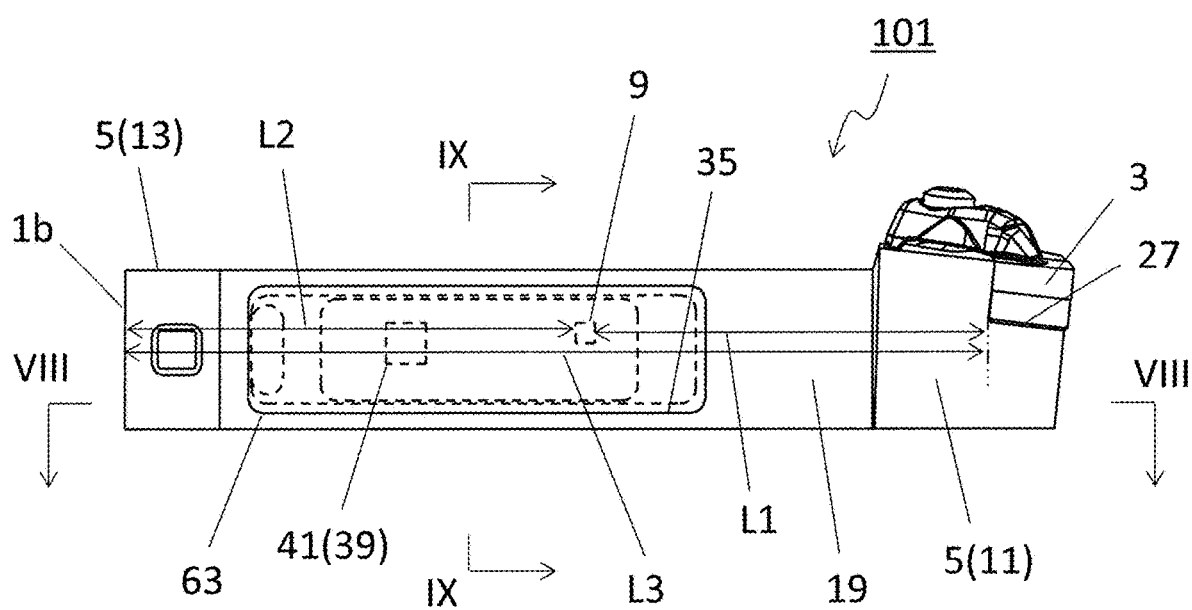
FIG. 7 is a side view of the cutting tool illustrated in FIG. 5 as viewed from A1 direction.

The antenna 7 may have a flat plate shape including a pair of main surfaces 7a as in a non-limiting embodiment illustrated in FIG. 6. If the antenna has the flat plate shape, the pair of main surfaces 7a may be parallel to the central axis O1. If the antenna 7 is located as described above, it may be easy to reduce propagation loss in wireless communication in the metal member 11 or the like.

For example, if a wireless signal from the antenna 7 has directivity, the wireless signal from the antenna 7 may tend to go forward in a direction orthogonal to the pair of main surfaces. Also, if the wireless signal from the antenna 7 has characteristics in all directions, it may be easy to ensure a state where no metal is present in surroundings, thus leading to improved antenna characteristics.

The sensor 9 may be located closer to the pocket 27 than the antenna 7. The sensor 9 may be located on a surface of the base 5 or may be located inside the base 5. As in the non-limiting embodiment illustrated in FIG. 2, the first side surface 19 of the base 5 may include a recess 35, and the sensor 9 may be located in the recess 35. Specifically, the recess 35 may be located between the pocket 27 in the first side surface 19 and the second end surface 17.

If the base 5 includes the recess 35 and the sensor 9 is located in the recess 35, it may be easier to attach the sensor 9 to the base 5 than cases where the sensor 9 is located inside the base 5. Additionally, the sensor 9 may be less susceptible to the influences of the scattering of the chips and the spray of the coolant than cases where the sensor 9 is merely located on the surface of the base 5.

The sensor 9 may be a member measurable states of the base 5 during the cutting process. Examples of the states of the base 5 may include physical quantities, such as temperature, acceleration, vibration, strain, internal stress and wear. The term "measuring the states of the base 5" may denote measuring at least one kind of information about the physical quantities represented above in the base 5. Measuring targets may be information in a dynamic state, namely, a change in state besides the information in a static state.

For example, information about the measuring target may be temperature. It may be assumed that a temperature of the base 5 before a cutting process is 20° and the temperature of the base 5 is increased to 80° during the cutting process. In this case, 20° that is the temperature of the base 5 before the cutting process may be information about temperature in the static state. An increase in the temperature of the base 5 in a range from 20° to 80° may be information about temperature in the dynamic state. One or both of these information may be measured.

For example, if the holder 1 includes a thermocouple as the sensor 9, it may be possible to measure the temperature of the base 5. Also, if the holder 1 includes a piezoelectric sensor using a piezo element, it may be possible to measure acceleration, vibration, strain and internal stress. Alternatively, the holder 1 may include a printed circuit that serves as the sensor 9. Specifically, in cases where the printed circuit is worn out as the base 5 is worn out, thus causing a change in resistance value of the circuit, a worn-out state of the base 5 may be measured by the change in resistance value.

The states of the base 5 measurable by the sensor 9 are not limited to the above physical values. The sensor 9 is not limited to the above embodiment, and other elements not particularly described above may be used as long as it may be possible to measure the physical values of the base 5 illustrated above. Examples thereof may include a camera and a microphone.

For example, it may be possible to evaluate a state of the cutting edge 29 of the insert 3 by measuring the state of the base 5. If the sensor 9 is located closer to the pocket 27 than the antenna 7, it may be easy to evaluate the state of the insert 3 with high accuracy. Particularly, if a distance from the sensor 9 to the pocket 27 (a first distance L1) is smaller than a distance from the sensor 9 to the second end 1b (a second distance L2), it is easy to evaluate the state of the insert 3 with higher accuracy. This is because a relatively short distance from the sensor 9 to the pocket 27 ensures that the sensor 9 is located close to the insert 3 located in the pocket 27.

The holder 1 may include a cover 63. The cover 63 may be located at an opening of the recess 35 as in a non-limiting embodiment illustrated in FIG. 8. In other words, the cover 63 may be located on the sensor 9. If the holder 1 includes the cover 63, the sensor 9 may be less likely to be damaged during the cutting process, thereby having water resistance to the coolant.

The sensor 9 may be wired connected to the antenna 7. Specifically, the holder 1 of the non-limiting embodiment may include a connection part 37 that establishes a wired connection between the sensor 9 and the antenna 7. Examples of the connection part 37 may include wiring using a conductor and a circuit. Transmission of information from the sensor 9 to the antenna 7 may be carried out using, for example, optical wiring instead of the embodiment described above.

Assuming that a distance from the pocket 27 to the second end 1b is a third distance L3, the second distance L2 may be larger or smaller than the third distance L3. If the second distance L2 is smaller than the third distance L3, namely, the sensor 9 is located closer to the second end 1b than the pocket 27, the connection part 37 may be less likely to become longer than necessary. This may make it easy to avoid degradation of durability due to deterioration of the connection part 37. Additionally, a connection state of the sensor 9 and the antenna 7 may tend to become stable.

The sensor 9 and the antenna 7 may be directly connected to each other, or may be wired connected through a module 41 including, for example, a first control part 39. As a non-limiting embodiment of configuration of the module 41, there may be one which includes a detection part 45 to detect a first signal 43 on the basis of a physical quantity measured by the sensor 9, a first control part 39 to control the first signal 43 detected by the detection part 45, and an output part 49 to output, as a second signal 47, a signal controlled by the first control part 39 to the antenna 7.

In cases where the antenna 7 and an external member to perform wireless communication constitute a wireless communication part 51, the information about the base 5 measured by the sensor 9 may be transmitted from the antenna 7 and then received by the wireless communication part 51. The information about the base 5 received by the wireless communication part 51 may be transmitted to an evaluation part 53. The evaluation part 53 may evaluate the state of the base 5.

For example, machining conditions, such as feed, cut depth, rotation speed of workpiece and spray amount of coolant, may be changed depending on an evaluation result. Depending on the situation, the cutting process may be stopped. The cutting 101 may be the turning tool in the non-limiting embodiment, however, if the cutting tool 101 is a rotating tool or drill, a rotation speed of the cutting tool 101 may be employed as changeable machining conditions.

As used herein, the term "wireless communication" may be a concept which is not limited to sending the information from the antenna 7 to the wireless communication part 51, but which includes sending information from the wireless communication part 51 to the antenna 7. Alternatively, the term "wireless communication" may include bidirectional information sending and receiving between the antenna 7 and the wireless communication part 51.

Examples of material of the metal member 11 may include steel and cast iron. Of these materials, steel may be used from the viewpoint of enhancing toughness of the metal member 11.

In cases where the metal member 11 and the first resin 13 are in contact with each other, the base 5 may include a cavity 61 surrounded by the metal member 11 and the first resin 13. The antenna 7 may be located in the cavity 61. If cutting load is exerted on the holder 1 in a direction from the side of the first end 1a to the side of the second end 1b during the cutting process, as in the case with the thrust force described above, the cutting load transmitted to the antenna 7 may tend to be released in the cavity 61. The antenna 7 may therefore be less likely to be crushed by the metal member 11 and the first resin 13.

The antenna 7 may be in contact with or located away from the metal member 11. In other words, there may be a clearance between the metal member 11 and the antenna 7. The thrust force may tend to be released in the clearance. The antenna 7 may therefore be less likely to be crushed by the metal member 11 and the first resin 13.

The holder 1 may further include a second resin 55 in addition to the first resin 13 as in the non-limiting embodiment illustrated in FIG. 2. The second resin 55 may be located between the metal member 11 and the first resin 13 as in the non-limiting embodiment illustrated in FIG. 2. As in the non-limiting embodiment illustrated in FIG. 6, the second resin 55 may have a ring shape surrounding the antenna 7 in a perspective view from a side of the second end 1b.

If including the second resin 55 as described above, for example, coolant may be less likely to enter between the antenna 7 and the first resin 13. The antenna 7 may therefore be less prone to degradation, thus having less influence on the wireless communication with the outside in the antenna 7.

In this case, hardness of the first resin 13 may be higher than hardness of the second resin 55. If the hardness of the first resin 13 is relatively high, it may be easy to stably support the holder 1 by the first resin 13. If the hardness of the second resin 55 is relatively low, airtightness of the antenna 7 can be enhanced by elastic deformation of the second resin 55 while maintaining the shape of the first resin 13. The hardness of the first resin 13 and the second resin 55 can be evaluated by conducting, for example, Rockwell-hardness test (JIS Z 2245:2016).

The first resin 13 and the second resin 55 are not limited to a specific resin. For example, one selected from among polycarbonate resin, polyethylene terephthalate resin, acrylic resin, polyvinyl chloride resin, silicon resin and epoxy resin may be used as a material of these resin members.

The first resin 13 may be joined to the metal member 11 by using an adhesive, or may be fixed thereto by using a screw 57. If the first resin 13 is joined to the metal member 11 by using the adhesive, it may be easy to enhance the airtightness of the antenna 7.

If the first resin 13 is fixed to the metal member 11 by using the screw 57, it may be easy to replace the antenna 7, for example, in cases where the antenna 7 is deteriorated.

The first resin 13 may be fixed to the metal member 11 by using the screw 57 as in the non-limiting embodiment illustrated in FIG. 6.

Specifically, the first resin 13 may include one or more through holes 59 extended along the central axis O1 from a side of the second end 1b toward the first end 1a. The holder 1 may further include one or more screw 57 that are inserted into the through holes 59 so as to fix the first resin 13 to the metal member 11.

The single or plurality of through holes 59 may be located closer to an outer periphery than the second resin 55 in a perspective view from a side of the second end 1b. Pressing force generated upon screwing may be likely to be transmitted from the first resin 13 to the second resin 55, but may be less likely to be transmitted to the antenna 7. It may therefore be easy to enhance the airtightness of the antenna 7, and the antenna 7 may be less likely to be crushed.

Figure 5:
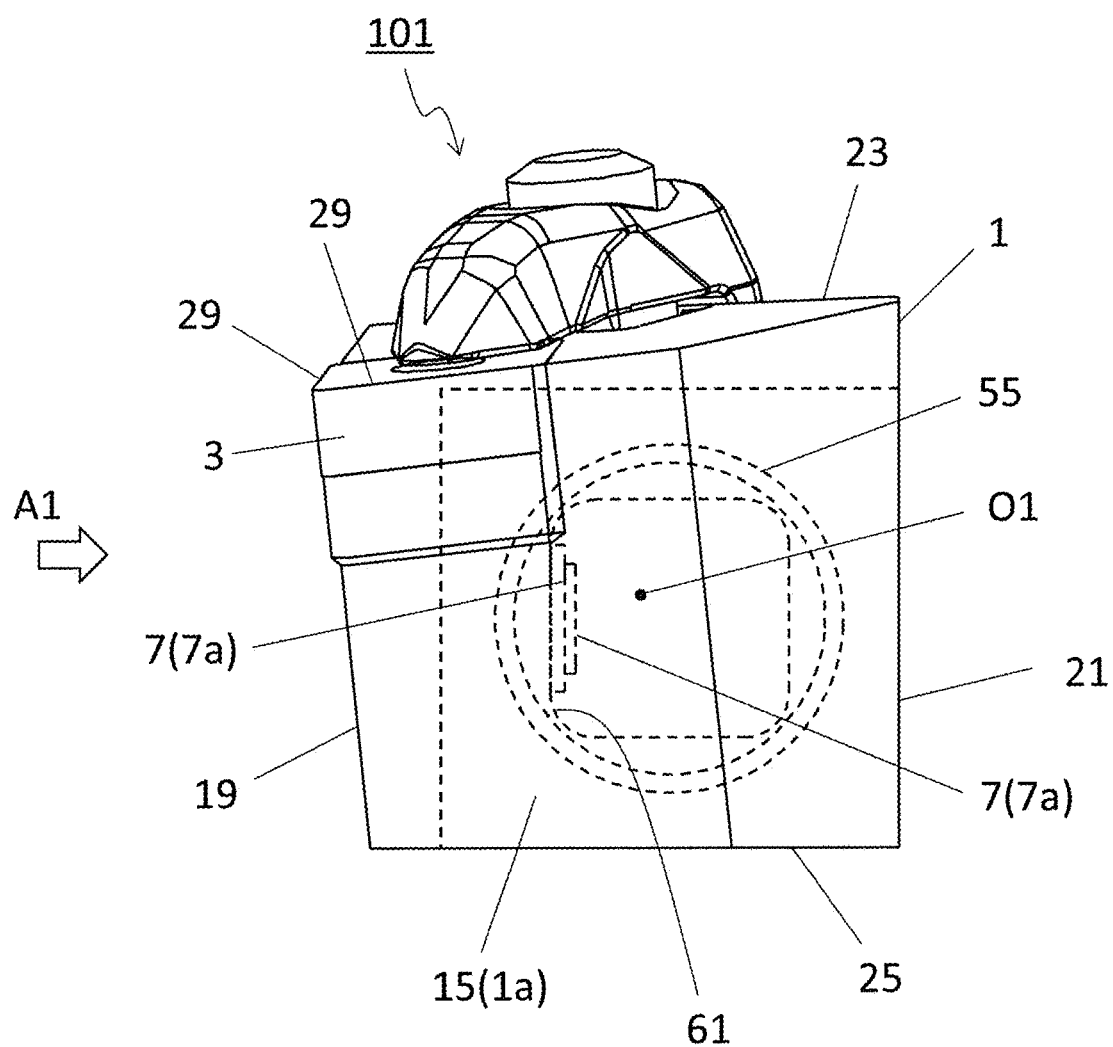
FIG. 5 is a plan view of the cutting tool illustrated in FIG. 1 as viewed toward a first end.

As described earlier, the insert 3 of the cutting tool 101 may include the cutting edge 29. As in the embodiment illustrated in FIG. 5, the antenna 7 may be located away from the cutting edge 29 in a perspective view from a side of the first end 1a. Cutting load may occur on the cutting edge 29 and the cutting load may be transmitted to the holder 1 during a cutting process. If the antenna 7 is located away from the cutting edge 29 in the perspective view from the side of the first end 1a, the thrust force may be less likely to be transmitted to the antenna 7. This may lead to enhanced durability of the antenna 7.

The antenna 7 may have further enhanced durability, for example, in cases where the cutting edge 29 is protruded further toward a first direction (a leftward direction in FIG. 5) than the base 5, and the antenna 7 may be located disproportionally on a side opposite to the first direction (on a right side in FIG. 5) relative to the central axis O1 in a perspective view from a side of the first end 1a.

Electric power may be supplied from an external power supply to the antenna 7 and the module 41. Alternatively, the holder 1 may include a battery, and electric power may be supplied from the battery. If the electric power is supplied from the external power supply to the antenna 7, there is no need to ensure space for mounting the battery in the holder 1.

If the electric power is supplied from the battery to the antenna 7 and the module 41, for example, there is no need to incorporate the cable that electrically connects the above power supply and the antenna 7 into a machine tool. This may facilitate use of an existing machine tool.

<Method for Manufacturing Machined Product>

A method for manufacturing a machined product in a non-limiting embodiment may be described below with reference to the drawings.

The machined product 201 may be manufacturable by carrying out a cutting process of a workpiece 203. The method for manufacturing the machined product 201 in the non-limiting embodiment may include the following steps:

(1) rotating the workpiece 203;
(2) bringing the cutting tool 101 represented by the above non-limiting embodiment into contact with the workpiece 203 being rotated; and
(3) moving the cutting tool 101 away from the workpiece 203.

Figure 11:
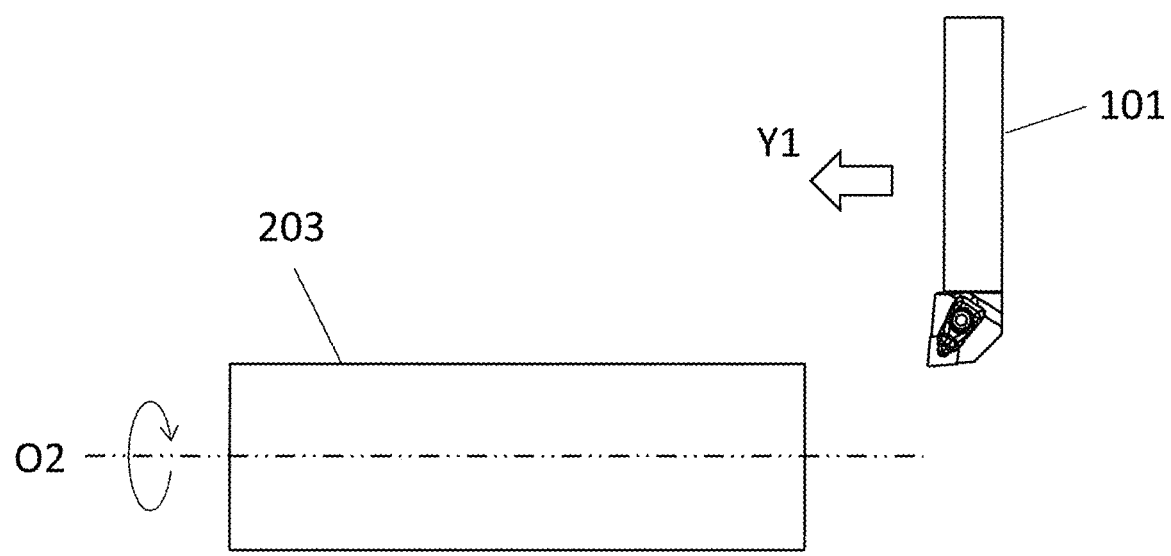
FIG. 11 is a schematic diagram illustrating one of steps in a method for manufacturing a machined product in a non-limiting embodiment.
Figure 12:
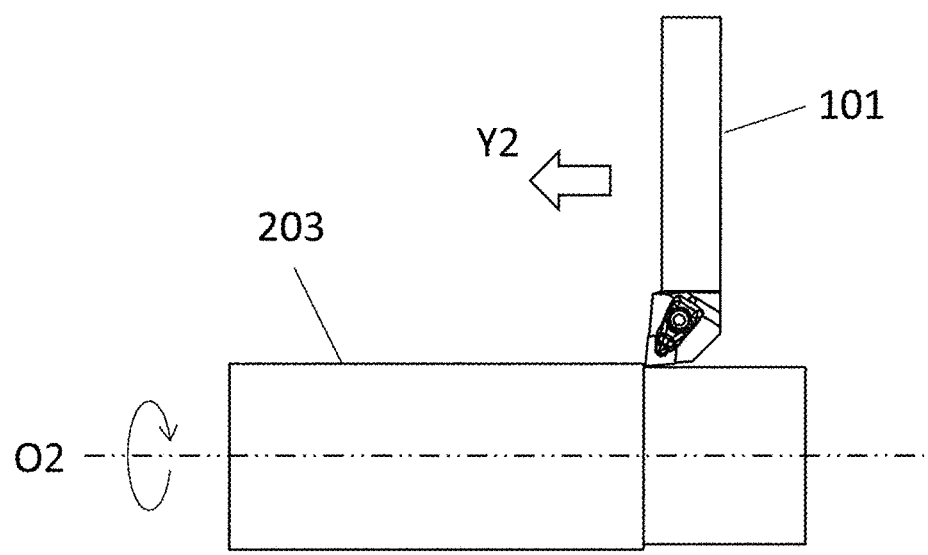
FIG. 12 is a schematic diagram illustrating one of the steps in the method for manufacturing a machined product in the non-limiting embodiment.
Figure 13:
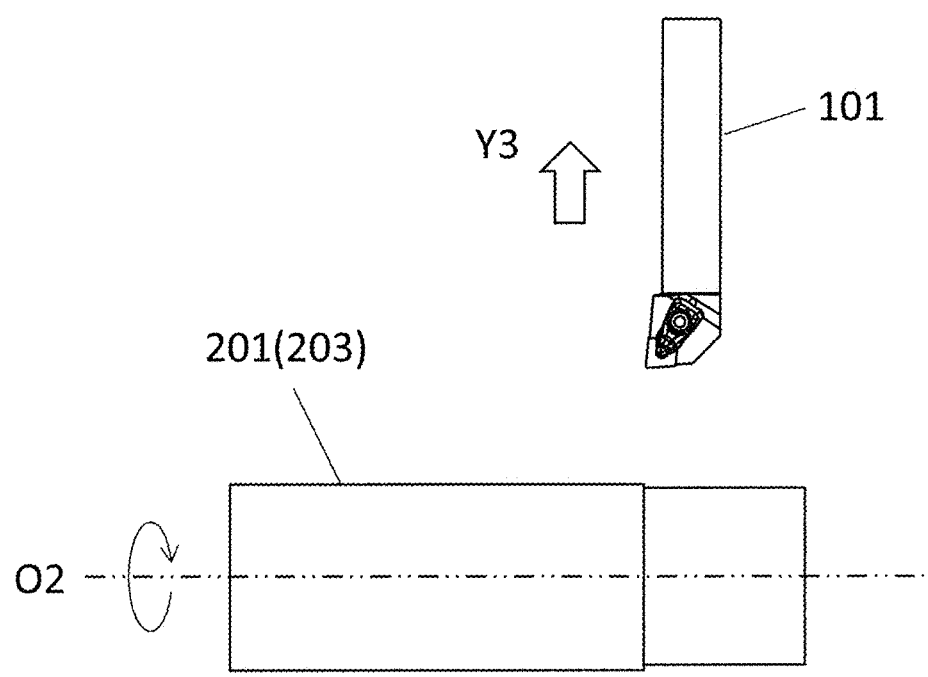
FIG. 13 is a schematic diagram illustrating one of the steps in the method for manufacturing a machined product in the non-limiting embodiment.

More specifically, the workpiece 203 may be rotated around a rotation axis O2, and the cutting tool 101 may be relatively brought near the workpiece 203 as illustrated in FIG. 11. Subsequently, the workpiece 203 may be cut out by bringing the cutting edge of the cutting tool 101 into contact with the workpiece 203 as illustrated in FIG. 12. Thereafter, the cutting tool 101 may be relatively moved away from the workpiece 203 as illustrated in FIG. 13.

The cutting tool 101 may be brought near the workpiece 203 by moving the cutting tool 101 in Y1 direction in a state where the axis O2 is fixed and the workpiece 203 is rotated in the non-limiting embodiment. In FIG. 12, the workpiece 203 may be cut out by bringing the cutting edge of the insert into contact with the workpiece 203 being rotated. In FIG. 13, the cutting tool 101 may be moved away by being moved in Y2 direction in a state where the workpiece 203 is rotated.

In the cutting process with the manufacturing method in the non-limiting embodiment, the cutting tool 101 may be brought into contact with the workpiece 203, or the cutting tool 101 may be moved away from the workpiece 203 by moving the cutting tool 101 in the individual steps. However, there is no intention to limit to the above embodiment.

For example, the workpiece 203 may be brought near the cutting tool 101 in the step (1). Similarly, the workpiece 203 may be moved away from the cutting tool 101 in the step (3). If the cutting process is continued, the step of bringing the cutting edge of the insert into contact with different portions of the workpiece 203 may be repeated while keeping the state where the workpiece 203 is rotated.

Representative examples of material of the workpiece 203 may include carbon steel, alloy steel, stainless steel, cast iron or nonferrous metals.

<Method for Controlling Cutting Process>

A method for controlling a cutting process in a non-limiting embodiment may be described below with reference to the drawings.

The state of the base 5 may be changed by cutting out the workpiece 203 in the above step (2). For example, the base 5 may vibrate, and strain and internal stress may occur in the base 5 because cutting load is exerted on the cutting tool 101 during the cutting process. The temperature of the base 5 may increase by carrying out the cutting process. The cutting edge may wear away. This may cause a change in vibration mode of the base 5.

For example, if the sensor 9 is a thermocouple, it may be possible to measure the temperature of the base 5. If the sensor 9 is a piezoelectric sensor, it may be possible to measure vibration, strain and internal stress of the base 5. Thus, the sensor 9 may include a measuring means for measuring the state of the base 5.

Figure 14:
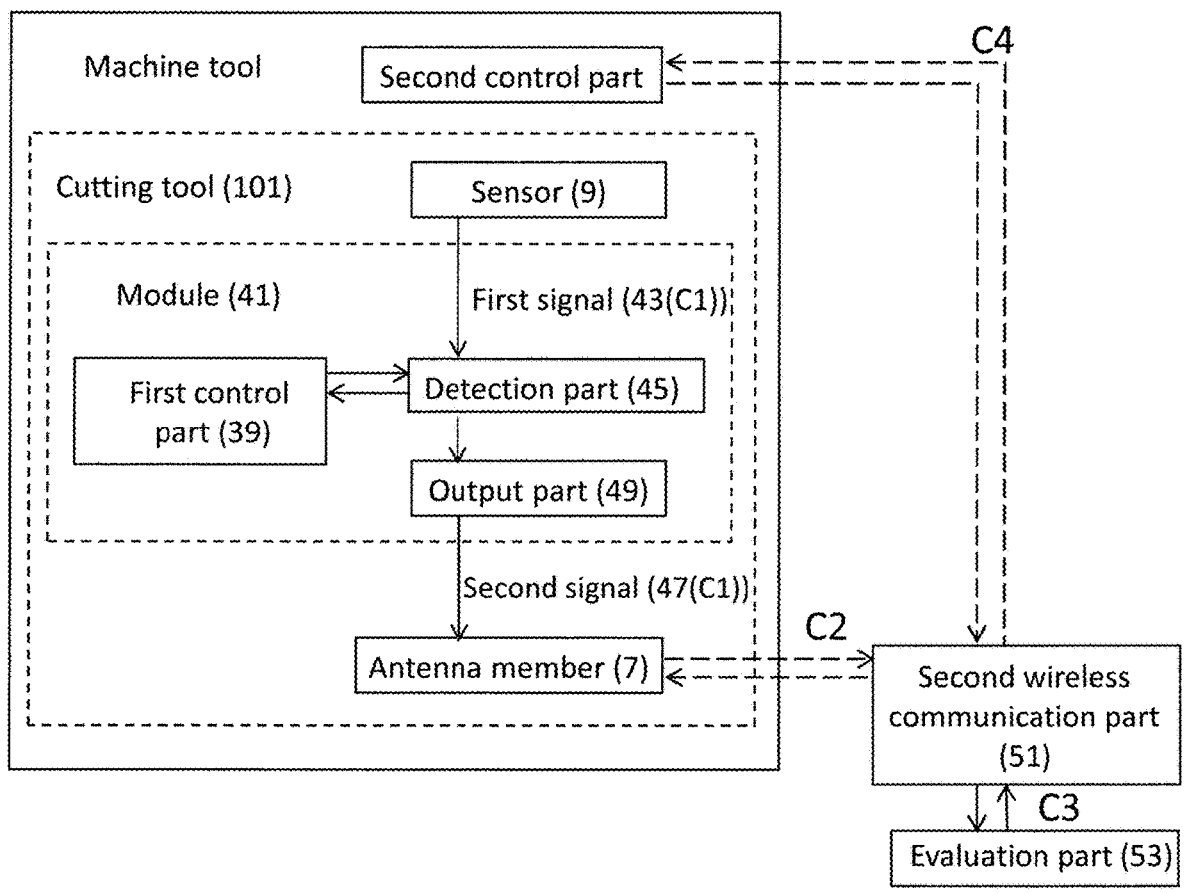
FIG. 14 is a block diagram illustrating a flow of a method for controlling a cutting process in a non-limiting embodiment.

Information measured in the sensor 9 may be transmitted from the sensor 9 to the antenna 7. That is, the sensor 9 may include a first transmission means C1 for transmitting measured information to the antenna 7 as illustrated in FIG. 14. The information transmitted from the sensor 9 may be sent from the antenna 7 to the outside. That is, the antenna 7 may include a second transmission means C2 for performing wireless communication with the outside with regard to the information transmitted from the sensor 9.

For example, the information sent from the antenna 7 to the outside may be received on the wireless communication part 51 and then transmitted to the evaluation part 53. The information transmitted to the evaluation part 53 may be compared with information on the basis of previously measured results, thereby may be evaluating the state of the base 5. Specifically, the evaluation part 53 may include a first evaluation means for evaluating the state of the base 5.

If the state of the base 5 thus evaluated satisfies a predetermined condition, machining conditions, such as feed, rotation speed of the workpiece 203 and spray amount of coolant, may be changed. Changed machining conditions may be transmitted to a second control part in the machine tool. Specifically, the evaluation part 53 may include a second evaluation means for evaluating machining conditions on the basis of results evaluated by the first evaluation means, and a third transmission means C3 for transmitting changed machining conditions evaluated by the second evaluation means to the wireless communication part 51.

Figure 15:
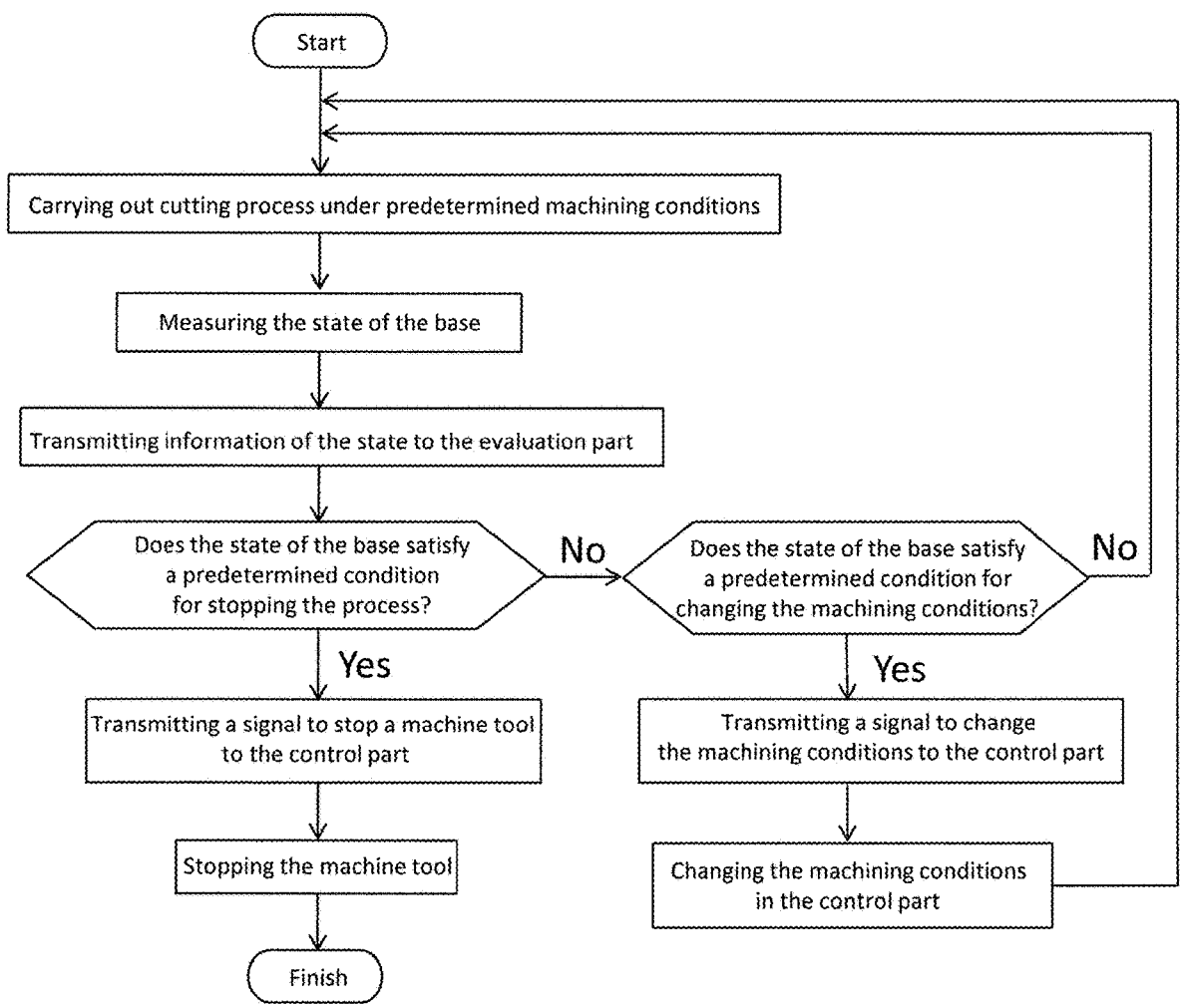
FIG. 15 is a flowchart in a method for controlling a cutting process in a non-limiting embodiment.

The wireless communication part 51 may include a fourth transmission means C4 for transmitting information to the second control part in the machine tool. The changed machining conditions may be transmitted to the second control part by the fourth transmission means C4. The cutting process may be continued under the changed machining conditions, or the cutting process may be stopped as illustrated in FIG. 15. The cutting process can be carried out under proper machining conditions through the foregoing processes.

The evaluation part 53 may include a third evaluation means for evaluating whether the cutting tool 101 is moved away from the workpiece 203. The cutting tool 101 is moved away from the workpiece 203 in the above step (3). Consequently, the vibration, strain and/or internal stress in the base 5 may become approximately zero.

For example, evaluation may be made that the cutting tool 101 is already moved away from the workpiece 203 on the basis of the fact that the information about the vibration, strain and internal stress fall below predetermined strength for a certain period of time.

If the third evaluation means at the evaluation part 53 evaluates that the cutting tool 101 is already moved away from the workpiece 203, the antenna 7 and the wireless communication with the outside may be stopped temporarily in order to reduce power consumption of a battery. For example, the wireless communication between the antenna 7 and the outside may be temporarily stopped in such a manner that a signal to temporarily stop the wireless communication is sent from the wireless communication part 51 to the second control part.

The configuration that the machine tool includes the two control parts of the first control part 39 and the second control part has been illustrated by the above non-limiting embodiment. However, there is no problem even if the machine tool includes only one control part that includes functions of the first control part 39 and the second control part.

The invention claimed is:

1. A holder, comprising:
   a base having a bar shape extended along a central axis from a first end toward a second end, and comprising a metal member comprising a pocket that is configured to receive an insert comprising a cutting edge, and a first resin located closer to the second end than the metal member;
   an antenna covered with the first resin;
   a sensor which is located closer to the pocket than the antenna, is connected by wiring to the antenna, and is configured to detect a state of the base; and
   a second resin having a ring shape, which is located between the metal member and the first resin, and surrounds the antenna in a perspective view from a side of the second end.

2. The holder according to claim 1, wherein
   the base comprises a cavity surrounded by the metal member and the first resin, and
   the antenna is located in the cavity.

3. The holder according to claim 1, wherein
   the antenna has a flat plate shape comprising a pair of main surfaces, and
   the pair of main surfaces is parallel to the central axis.

4. The holder according to claim 1, wherein
the metal member is located away from the antenna.

5. The holder according to claim 1, wherein
hardness of the first resin is higher than hardness of the second resin.

6. The holder according to claim 1, wherein
the first resin comprises one or more through holes located closer to an outer periphery of the base than the second resin in the perspective view from the side of the second end, and extended from a side of the second end toward the first end along the central axis, and
the holder further comprises one or more screws inserted into the one or more through holes so as to fix the first resin to the metal member.

7. The holder according to claim 1, wherein
the base further comprises
an end surface located at the second end,
a recess located between the pocket and the end surface, and
the sensor is located in the recess.

8. A cutting tool, comprising a holder and an insert, wherein:
the holder comprises:
a base having a bar shape extended along a central axis from a first end toward a second end, and comprising
a metal member comprising a pocket that is configured to receive the insert comprising a cutting edge, and
a first resin located closer to the second end than the metal member;
an antenna covered with the first resin;
a sensor which is located closer to the pocket than the antenna, is connected by wiring to the antenna, and is configured to detect a state of the base; and
a second resin having a ring shape, which is located between the metal member and the first resin, and surrounds the antenna in a perspective view from a side of the second end; and
the insert is located in the pocket.

9. The cutting tool according to claim 8, wherein
the antenna is spaced from the cutting edge in a perspective view from a side of the first end.

10. The cutting tool according to claim 9, wherein,
in the perspective view from the side of the first end, the cutting edge is further protruded in a first direction than the base.

11. A method for collecting data, comprising:
rotating a workpiece;
bringing the cutting tool according to claim 8 into contact with the workpiece;
causing the sensor to measure a state of the base; and
performing wireless communication with an outside through the antenna about information measured at the sensor.

12. A method for manufacturing a machined product, the method comprising:
rotating a workpiece;
bringing a cutting tool into contact with the workpiece being rotated; and
moving the cutting tool away from the workpiece, wherein
the cutting tool comprises a holder and an insert,
the holder comprises:
a base having a bar shape extended along a central axis from a first end toward a second end, and comprising
a metal member comprising a pocket that is configured to receive the insert comprising a cutting edge, and
a first resin located closer to the second end than the metal member,
an antenna covered with the first resin,
a sensor which is located closer to the pocket than the antenna, is connected by wiring to the antenna, and is configured to detect a state of the base, and
a second resin having a ring shape, which is located between the metal member and the first resin, and surrounds the antenna in a perspective view from a side of the second end, and
the insert is located in the pocket.

\* \* \* \* \*